(12) United States Patent
Godas et al.

(10) Patent No.: US 8,605,738 B2
(45) Date of Patent: Dec. 10, 2013

(54) METHOD AND SYSTEM FOR REDIRECTING NETWORKED TRAFFIC

(75) Inventors: Eric Joseph Godas, Smithtown, NY (US); Stephen Kramer, Jamaica Estates, NY (US)

(73) Assignee: CSC Holdings, LLC, Bethpage, NY (US)

( * ) Notice: Subject to any disclaimer, the term of this patent is extended or adjusted under 35 U.S.C. 154(b) by 375 days.

(21) Appl. No.: 12/985,816

(22) Filed: Jan. 6, 2011

(65) Prior Publication Data

US 2011/0261689 A1    Oct. 27, 2011

Related U.S. Application Data

(63) Continuation of application No. 10/964,488, filed on Oct. 13, 2004, now Pat. No. 7,894,445.

(51) Int. Cl.
*H04L 12/28* (2006.01)

(52) U.S. Cl.
USPC .......................................................... 370/401

(58) Field of Classification Search
USPC .......................................................... 370/401
See application file for complete search history.

(56) References Cited

U.S. PATENT DOCUMENTS

| | | | |
|---|---|---|---|
| 6,247,054 B1 * | 6/2001 | Malkin | 709/225 |
| 6,826,173 B1 * | 11/2004 | Kung et al. | 370/352 |
| 7,516,198 B1 * | 4/2009 | Appala et al. | 709/219 |
| 7,852,771 B2 * | 12/2010 | Ashwood-Smith | 370/238 |
| 8,139,551 B2 * | 3/2012 | Katsube et al. | 370/338 |
| 2002/0044553 A1 * | 4/2002 | Chakravorty | 370/392 |

* cited by examiner

*Primary Examiner* — Chandrahas Patel
(74) *Attorney, Agent, or Firm* — Goodwin Procter LLP

(57) ABSTRACT

A method of redirecting network traffic from a first, uncontrolled network to a second, controlled network by rewriting the Type of Service field in the header information of an Internet Protocol (IP) packet so as to include a service code indicating that the IP packet cannot access the uncontrolled network, thereby redirecting the network traffic to a second network element.

17 Claims, 11 Drawing Sheets

300 →
cable qos profile 20 max-burst 1600
cable qos profile 20 max-downstream 64
cable qos profile 20 max-upstream 64
cable qos profile 20 tos-overwrite 0xn 0xm
cable qos profile 20 name Walled_Garden_Profile

Figure 3

400 route-map walledgarden permit 10
match ip address 130
set interface TunnelX

Figure 4

Access-list 130:

access-list 130 deny   ip any host 123.4.555.66 dscp 0xn 0xm
access-list 130 deny   udp any any eq snmp any dscp 0xn 0xm
access-list 130 deny   udp any any eq domain dscp 0xn 0xm
access-list 130 deny   udp any any eq bootpc any dscp 0xn 0xm
access-list 130 deny   udp any any eq time dscp 0xn 0xm
access-list 130 deny   icmp any any dscp 0xn 0xm
access-list 130 permit ip any any dscp 0xn 0xm

```
interface Vlan2
description [CMTS] Huntsville NY - (huvlny)
ip address 999.888.77.66 555.444.333.222
ip policy route-map walledgarden
```

600

```
CE-7320#show running-config
hostname CE-7320
!
http proxy outgoing origin-server
http reval-each-request all
!
ip domain-name cv.net
!
primary-interface FastEthernet 3/0
!
interface FastEthernet 3/0
 ip address 44.444.444.444 555.555.555.555
 exit
!
wccp router-list 1 123.123.123.123
wccp web-cache router-list-num 1
wccp version 2
!
url-filter good-sites-allow
/local1/smartfilter/goodurl.lst
url-filter custom-message /local1/smartfilter
url-filter good-sites-allow enable
!
```

Figure 7

CE-7320#type goodurl.1st
http://www.cablevision.com
http://ams.optonline.net

Figure 9

METHOD AND SYSTEM FOR REDIRECTING NETWORKED TRAFFIC

CROSS-REFERENCE TO RELATED APPLICATIONS

This application is a continuation application of U.S. patent application Ser. No. 10/964,488, filed Oct. 13, 2004, the entire contents of which are incorporated by reference herein.

FIELD OF THE INVENTION

The present invention relates to a method and system for redirecting networked traffic.

BACKGROUND INFORMATION

Cable modems are designed to operate over cable television lines. Because the cable used by cable television may provide much greater bandwidth than telephone lines, a cable modem may provide suitable access to the Internet and the World Wide Web.

To deliver services over a cable network, a cable modem termination system (CMTS) may communicate with cable modems located, for example, in subscriber homes, to create a virtual local area network (VLAN) connection. To access the services, a cable service provider normally requires that the cable modem be properly registered. However, in certain instances, a non-registered cable modem may be provided with access to the service during a limited time period as an inducement to try the service. For instance, a non-registered cable modem may be provided, for example, with 9 days of trial service so that the user may experience the service without charge or commitment. After the trial period, the cable modem may be effectively disabled, thereby preventing all access to the service. In this regard, the cable modem may be disabled, for example, by disabling its Media Access Control (MAC) address, which is a hardware address that may uniquely identify the cable modem.

The disabling of the cable modem in this manner is sometimes referred to as "bricking" the cable modem. A cable modem may be bricked for a variety of reasons in addition to the one discussed above. For example, a modem may be bricked if a user account is determined to be severely past due or if a particular service violation has occurred.

A user whose cable modem has been bricked may not be provided with adequate information as to why to modem has been bricked, or even that the cable modem is in such a bricked state. For example, a user whose cable modem is bricked may not be aware that the cable modem has been bricked and instead, for example, may assume the blocked service is due to a failure of the network or cable modem hardware. Consequently, the user may attempt to contact a customer support representative of the cable service provider, or the cable modem manufacturer, to report the problem. Alternatively, the user may assume that the cable service provider is aware of the failure and decide to wait for the problem to be corrected without contacting the customer support service representative. Consequently, a bricked modem may cause users to experience confusion, frustration, and/or resentment.

SUMMARY OF THE INVENTION

The present invention provides a method and system to redirect networked traffic. In this regard, the traffic may be redirected, for example, to a particular network address intended to facilitate the interaction of users and providers in a so-called "Walled Garden" environment that controls the information and Web sites the user is able to access.

The present invention may be used, for example, to redirect traffic originating from a cable modem. In particular, an exemplary method and/or embodiment of the present invention may involve the delivering of a specialized configuration file to the cable modem, which associates the cable modem with a particular cable modem termination system (CMTS) Quality of Service (QOS) Profile, which ensures that certain bytes of all the traffic leaving the modem are rewritten to have a certain value. Through certain configurations in the headend distribution switches of the cable access network, the traffic originating from the cable modem is examined and traffic with the particular overwritten value is redirected through a tunnel to a remote switch. The remote switch forwards the traffic to a controlled network so that the user of the cable modem is limited to browsing only certain pre-defined Web sites, including, for example, a self-provisioning Web page.

DETAILED DESCRIPTION

Figure 1A:
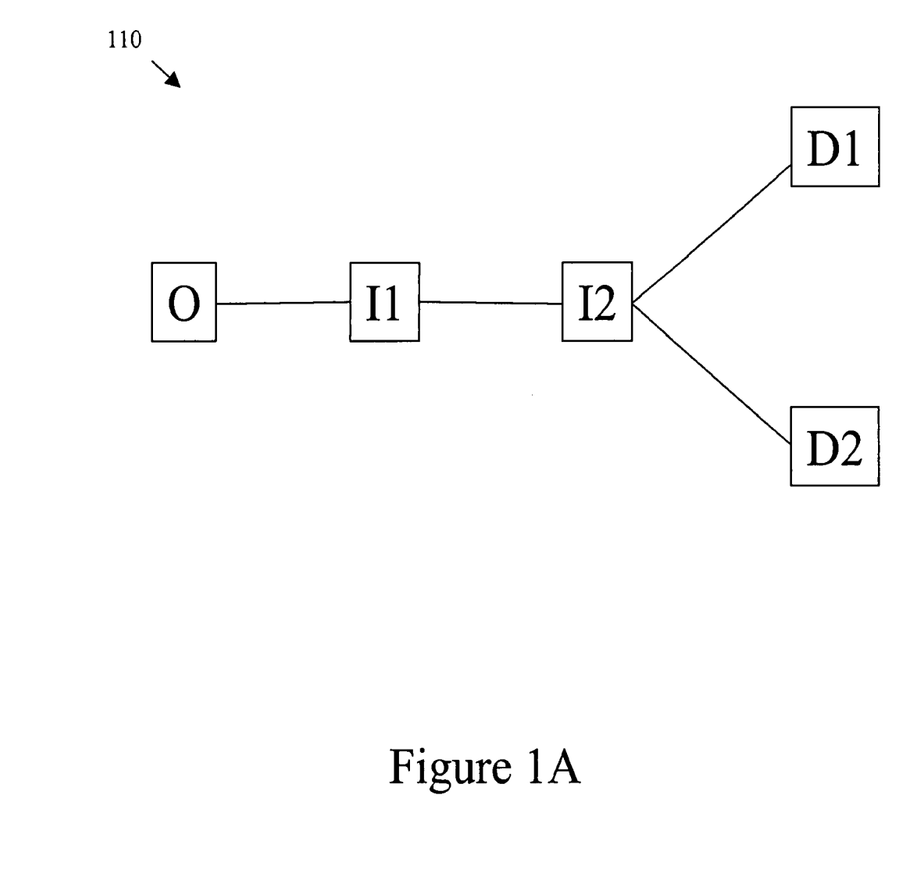
FIG. 1A shows an exemplary system to redirect networked traffic.

FIG. 1A shows an exemplary system 110 to redirect network traffic. The exemplary system 110 includes an originating network element O, a first intermediate network element I1, a second intermediate network element I2, a first destination network element D1, and a second destination network element D2. The originating network element O is configured to send network traffic to the first intermediate network element I1, which is configured to send the network traffic to the second intermediate network element I2, which sends the network traffic to the first destination network element D1 or the second destination network element D2.

According to an exemplary embodiment of the present invention, the network traffic transmitted from the originating network element O to the first intermediate network element I1, which is intended for the first destination element D1, is redirected to the second destination element D2. In particular, a certain portion of all the packets transmitted from the originating network element O to the first intermediate network element I1 is re-written by the originating network element O or the first intermediate network element I1 prior to being sent to the second network element I2, which sends the packets with the specially re-written portion to the second destination network element D2 rather than the first destination network element D1. The re-written portion may be, for example, one or more bits of an eight-bit field reserved by a standardized protocol to designate a Type of Service.

In this instance, the network elements O, I1, I2, D1, D2 are configured to communicate via the suite of Internet communications protocols as specified in technical reports called Request for Comments (RFCs), which are developed and published by the Internet Engineering Task Force (IETF). Accordingly, the network elements O, I1, I2, D1 and D2 are each configured to send and receive Internet Protocol defined packets (also referred to as internet datagrams) using Ethernet. Internet Protocol (IP) is a network layer protocol, which specifies the addressing information that enables packets to be routed. Ethernet is a local area network (LAN) architecture developed by a consortium of manufacturers, which uses the Carrier Sense Multiple Access Method with Collision Detect (CSMA/CD) and served as the basis for the IEEE 802.3 standard, which defines the Media Access Layer (MAC) layer for bus networks that use CSMA/CD. IEEE is short for Institute of Electrical and Electronics Engineers, a standards-making body responsible for many telecommunications and computing standards.

Figure 1B:
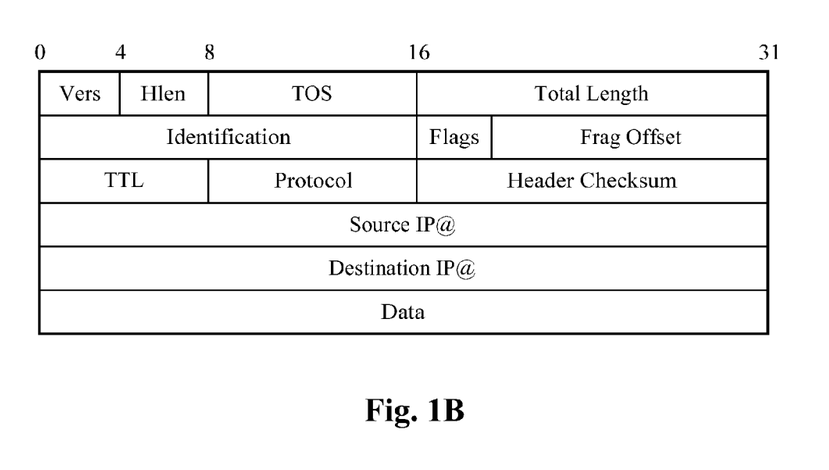
FIG. 1B shows the format of an Internet Protocol Version 4 (IPv4) packet.

FIG. 1B shows the format of an Internet Protocol Version 4 (IPv4) packet, which may be encapsulated in the IP Datagram field of the IEEE 802.3 transmission frame structure. The IPv4 packet format includes four bits to designate the Version of Internet Protocol used, four bits to designate the header length, eight bits to indicate the Type of Service (TOS), sixteen bits to designate a total length of the packet, sixteen bits to designate an identification value assigned by the sender of the packet, three bits to designate one or more control flags, thirteen bits to designate a fragment offset, eight bits to designate a time to live (TTL), eight bits to designate a next level protocol, sixteen bits to designate a header checksum, thirty-two bits to designate the source address, thirty-two bits to designate a destination address, and one or more bytes of data. The Internet Protocol Version 4 (IPv4) packet format is documented in Request for Comment (RFC) 791.

According to an exemplary embodiment of the present invention, one or more bits of the eight-bit Type of Service (TOS) field in each of the IP packets received by the first intermediate network element I1 of the exemplary system 110, which were transmitted from the origination network element O, is re-written by the first intermediate network element I1 to a predefined value prior to forwarding the packets to the second intermediate network element I2, which is configured to redirect the IP packets with the predefined re-written value to the second destination network element D2, regardless, for example, of the intended destination address specified in the IP packet.

Figure 1C:
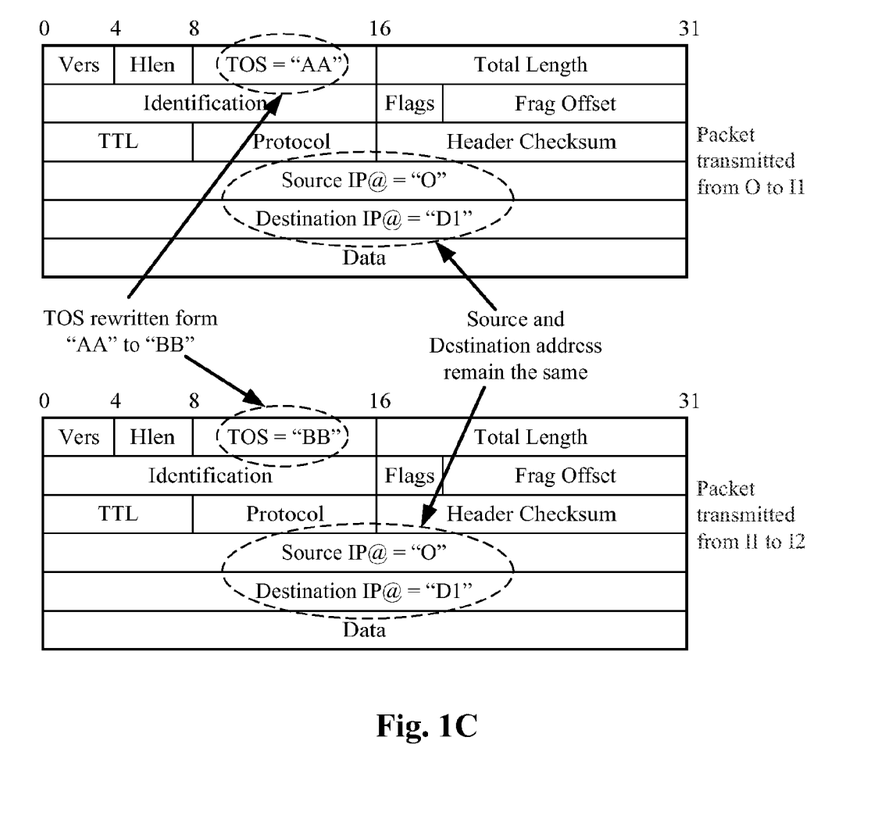
FIG. 1C shows representations of an exemplary Internet Protocol (IP) packet as transmitted from the originating and first intermediate network elements of the exemplary system of FIG. 1A, demonstrating how the Type of Service field (TOS) of the exemplary IP packet is rewritten by the first intermediate network element.

FIG. 1C shows representations of an exemplary IP packet as transmitted from the originating network element O to the first intermediate network element I1, and as transmitted from the first intermediate network element I1 to the second intermediate network element I2, demonstrating how the Type of Service field (TOS) of the exemplary IP packet is rewritten by the first intermediate network element I1. In particular, the exemplary IP packet as transmitted from the originating network element O to the first intermediate network element I1, which includes a TOS field value of "AA", is re-written by the originating network element O or the first intermediate network element I1 so that the exemplary IP packet as transmitted from the first intermediate network element I1 to the second intermediate network element I2 includes a TOS field value of "BB". Accordingly, the second intermediate network element I2 is configured to examine the TOS field value of the incoming packet and determine that a value of "BB" indicates that the packet should be redirected to the second destination network element D2 rather than the first destination network element D1 as specified, for example, in the Destination Address field of the packet.

Figure 1D:
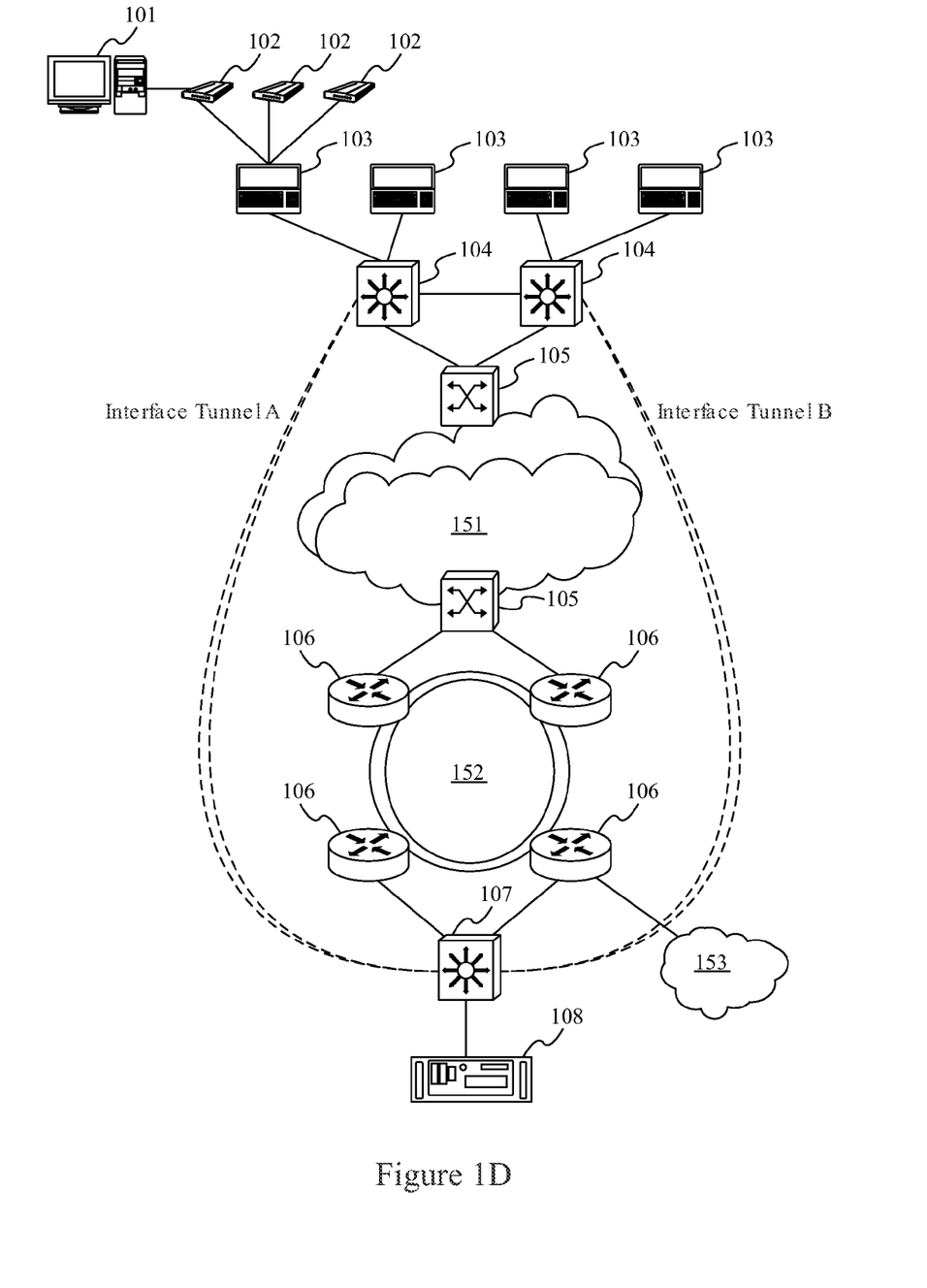
FIG. 1D shows another exemplary system to redirect networked traffic.

FIG. 1D shows another exemplary system 100 to redirect network traffic. The exemplary system 100 includes a personal computer 101, one or more cable modems 102, a series of cable modem termination systems 103, two headend distribution switches 104, an intermediary network 151 including two optical node switches 105, a secondary network 152 including four routers 106, a remote switch 107, and a cache server 108.

The cable modem termination systems 103, each provide high-speed network access, including, for example, Internet access, to one or more subscribers equipped with a cable modem 102. In this context, the Internet may refer to, for example, the global network of all computers and networks that can be reached via an Internet Protocol (IP) address. The subscriber's cable modem 102 may reside, for example, in a residence and may be connected, for example, to a personal computer (PC) 101 through 10Base-T Ethernet Card or Universal Serial Bus (USB) connection. The cable modem termination systems 103 send and receive digital cable modem signals from the subscriber's cable modem 102, converting the signals into Internet Protocol (IP) defined packets.

The cable modem 102 and cable modem termination systems 103 operate according to the Data Over Cable Service Interface Specification (DOCSIS), which defines interface standards for cable modems and supporting equipment, including the interface standards that define modulation schemes and the protocol exchanging bi-directional signals over coaxial cable. For example, to deliver data services, DOCSIS may specify an allocation of a 6 MHz radio frequency (RF) channel in the 50-750 MHz spectrum range for downstream traffic to cable modem users and another channel in the 5-42 MHz band to carry upstream signals. The cable modem termination systems 103 may communicate through these channels with the cable modems 102 to create a virtual local area network (VLAN) connection.

Certain versions of DOCSIS, such as, for example, DOCSIS 1.1 may provide an enhanced Media Access Control (MAC) layer that contains quality of service (QOS) mechanisms. In this context, quality of service may refer to the ability to provide individualized service to selected network traffic over various technologies. Accordingly, the cable modem termination systems 103, which are compliant with the DOCSIS standard, may use the DOCSIS quality of service (QOS) mechanisms to provide individualized service to the cable modems 102 with respect to, for example, certain network and headend distribution equipment facilities.

DOCSIS was developed by CableLabs, Inc. and a consortium of North American multi-system cable operators. CableLabs Inc. may provide a certification process to ensure DOCSIS cable modems manufactured by different vendors comply with the standard and are interoperable. CableLabs Inc. may also provide a separate qualifying process for cable modem termination system (CMTS) equipment. The International Telecommunications Union (ITU) accepted DOCSIS as a cable modem standard, which is referred to as ITU standard J.122.

The headend distribution switches 104 provide data connectivity between the cable modem termination systems 103 and one or more networks. In this instance, the headend distribution switches 104 provide data connectivity between the cable modem termination systems 103 and an intermediary network 151 conforming to the SONET standard. SONET is short for Synchronous Optical NETwork, an American National Standards Institute (ANSI) standard for fiber optic transmission systems. The SONET standard defines a hierarchy of interface rates that allow data streams at different rates to be multiplexed. In this regard, SONET may establish, for example, Optical Carrier levels from 51.8 Mbps (sometimes referred to as OC-1) to 2.48 Gbps (sometimes referred to as OC-48) or even 39.8 Gbps (sometimes referred to as OC-768). It will be appreciated that the headend distribution switches 104 may be configured to provide access to other standardized networks, including, for example, networks conforming to Synchronous Digital Hierarchy (SDH) as standardized by the International Telecommunications Union (ITU).

The intermediary network 151 conforming to the SONET standard may include, for example, two optical node switches 105, which provide data connectivity between the headend distribution switches 104 and a secondary network 152, which provides data connectivity between the intermediary network 151 and the remote switch 107 or another network 153, such as, for example, the Internet. The secondary network 152 includes four routers 106 configured in a ring topography. The routers 106 may be, for example, Cisco Systems Gigabit Switch (GSR) routers. The remote switch 107 and headend distribution switches 104 may be implemented, for example, as Cisco Systems 6509 family switches.

The remote switch 107 and headend distribution switches 104 may be configured to provide interface tunnels, which are logical structures that encapsulate the frame and data of one protocol inside the data field of another protocol thereby providing a temporary path between networked entities. In this regard, interface tunnels are not tied to specific "passenger" or "transport", but rather, provide the services of a point-to-point encapsulation scheme between the network entities. In this instance, the remote switch 107 and head distribution switches 104 are configured to provide two interface tunnels A and B between the headend distribution switches 104 and remote switch 107. Interface tunnels A and B are not physical transmission paths that are alternative to the physical transmission path through networks 151 and 152; instead they represent alternative ways data transmitted over networks 151 and 152 may be formatted or encapsulated. More specifically, an interface tunnel A is configured between one of the two head end distribution switches 104 and the remote switch 107, and an interface tunnel B is configured between the other of the two headend distribution switches 104 and the remote switch 107. The interface tunnels A and B may be used to "steer" traffic to the remote switch 107 through a virtual "channel" across network facilities, in this instance, the intermediary network 151 and secondary network 152. The interface tunnels A and B may be implemented using any suitable tunneling protocol, including, for example, Generic Routing Encapsulation (GRE) developed by Cisco Systems and documented in RFC 2784 and RFC 1701/2.

The remote switch 107 may support the Web Cache Communication Protocol (WCCP), developed by Cisco Systems, which specifies interactions between one or more routers (or Layer 3 switches) and one or more Web-caches, for the purpose of establishing and maintaining a transparent redirection of selected types of traffic. In this instance, the selected traffic is redirected to the cache server 108, which performs Web content caching and retrieval. Here, caching refers to the technique of keeping frequently accessed information in a more accessible location rather than "pulling" the information from its source in order to provide, for example, faster access to the requester. Hence, Web content caching may refer, for example, to the caching of Hypertext Markup Language (HTML) documents and associated graphics, which exist on interconnected servers of the Wide World Web and transferred via the HyperText Transfer Protocol (HTTP). Accordingly, the cache server 108 may be a dedicated application to locally store, for example, Web page graphics and HTML documents so that subsequent requests to access to the Web page content may be satisfied by "pulling" locally stored content rather than retrieving the Web page content from the original source. The cache server 108 may be implemented, for example, as a Cisco Systems cache server or generic web proxy server/application that supports WCCP.

Figure 2:
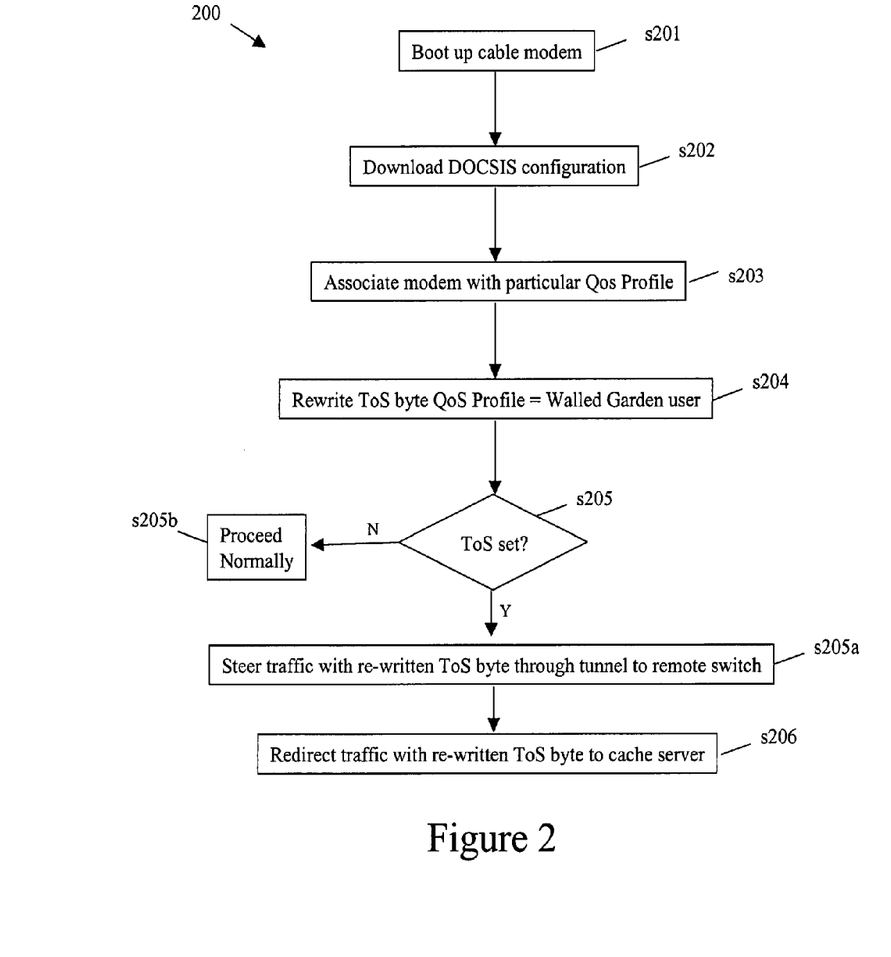
FIG. 2 shows an exemplary method to redirect networked traffic.

FIG. 2 shows an exemplary method 200 to redirect Internet traffic.

In step s201, cable modem 102 is booted up and detected by the cable modem termination system 103. In this regard, the cable modem 102 may be detected, for example, upon the cable modem 102 achieving an online state and communicating its Media Access Control (MAC) address to the cable modem termination system 103.

In step s202, a cable modem configuration file is downloaded from the cable modem termination system 103 to the cable modem 102. The cable modem configuration file may include, for example, several kinds of information needed to properly configure the cable modem 102 and its relationship with the cable modem termination system 103. In this regard, the cable modem configuration file may include, for example, certain parameters pertaining to the Data Over Cable Service Interface Specifications (DOCSIS) for cable modems and associated equipment. In particular, the cable mode configuration file may include parameters pertaining to the DOCSIS Quality of Service (QOS).

In step s203, the cable modem 102 is associated with a particular Quality of Service (QOS) Profile or service class name based on information stored in the cable modem termination system 103 regarding the service(s) to which the cable modem 102 is entitled to. In this context, "profile" may refer, for example, to a set of parameters defining the way the cable modem 102 interacts with other devices or systems, such as the cable modem termination system 103. In this instance, the cable modem 102 is associated with QOS Profile #20 to indicate that the cable modem 102 is entitled to only limited service, referred herein as "Walled Garden" service.

In step s204, the Type of Service (TOS) field of all Internet Protocol (IP) traffic originating from the cable modem 102 associated with the QOS Profile #20 is re-written by the cable modem termination system 103 to a specific value, such as, for example, "0x0c". The Type of Service (TOS) field is an 8-bit field within the Internet Protocol (IP) header as defined by, for example, Internet Protocol Version 4 (IPv4).

In step s205, the headend distribution switches 104 examine the Internet Protocol (IP) traffic sent by the cable termination system 103 to see if the Type of Service (TOS) field has been re-written to the Walled Garden values. In step s205a, the traffic with a Type of Service (TOS) field rewritten in the manner just described is "steered" through the intermediary and secondary networks 151 and 152 via tunnel A or B to the remote switch 107. In particular, configurations within the headend distribution switches 104 ensure that all traffic with the re-written TOS value is steered through the intermediary and secondary networks 151 and 152 to the remote switch 107 by encapsulating IP packets with the re-written TOS field into an Ethernet Frame, whose destination address field is encoded to ensure that the packet is delivered to the remote switch 107. In this instance, the encapsulation may involve adding extra header information to the packet in addition to the layer 2 and 3 headers so that the routing infrastructure at the receiving end may distinguish it among other packets, whereupon the extra header information is stripped off leaving the original packet intact. Otherwise, in step s205*b*, traffic with a Type of Service (TOS) field not re-written with the special value is routed in a normal manner according to the contents of the Internet Protocol (IP) destination address field. To ensure that other packets do not unintentionally end up in the Walled Garden, the TOS field of these packets may be explicitly set to a value other than the special value, such as, for example, zero.

In step s206, the remote switch 107 redirects all traffic with the re-written Type of Service (TOS) field to a cache server 108, instead of to the originally requested destination in the network 153, as represented by the Internet Protocol (IP) destination address included therein. In this regard, the remote switch 107 may run the Web Caching Communication Protocol (WCCP) or other suitable protocol, which diverts the traffic to the cache server 108, regardless of the destination address encapsulated Ethernet frame. The cache server 108 may then substitute the original destination address with that of certain pre-defined Web sites, including for example, a self-provision Web page.

Thus, an Internet Protocol (IP) packet originating from a cable modem and provided with a destination address representing a destination selected by a cable modem user will not arrive at this destination if the TOS field has been re-written in the manner described. It will not arrive at this destination because the detection of the re-written TOS field causes the IP packet to be encapsulated with an Ethernet frame that contains a different destination address identifying remote switch 107.

Figure 3:
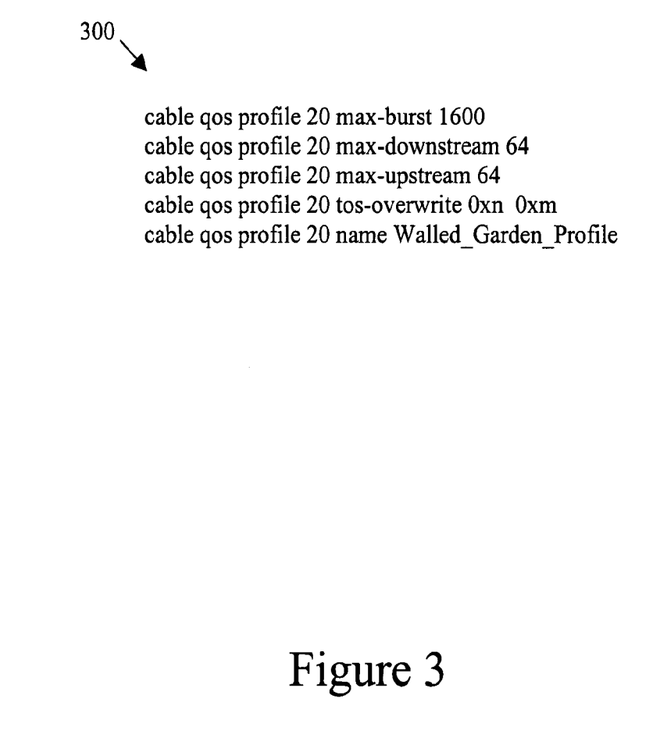
FIG. 3 shows exemplary directives to define a cable modem termination system (CMTS) Quality of Service (QOS) profile.

FIG. 3 shows exemplary directives 300 to define the cable modem termination system (CMTS) Quality of Service (QOS) profile #20, which ensures that traffic associated with this profile will have its Internet Protocol (IP) Type of Service (TOS) field rewritten to "0xn 0xm". The exemplary directives 300 include directive "cable QOS profile 20 tos-overwrite 0xn 0xm" to specify that traffic associated with QOS profile 20 is to have its Internet Protocol (IP) Type of Service (TOS) rewritten with the value "0xn 0xm", where "0xn" and "0xm" are hexadecimal numbers. The exemplary directives 300 also include directives "cable QOS profile 20 max-burst 1600," "cable QOS profile 20 max-downstream 64," and "cable QOS profile 20 max-upstream 64" to specify limits of resource utilization, and directive "cable QOS profile 20 name Walled_Garden_Profile" to specify a name for the QOS profile 20. The exemplary directives 300 may be issued to the cable modem termination system 103, for example, collectively as part of an executable file or individually via a suitable user interface of the headend distribution switches 104.

Figure 4:
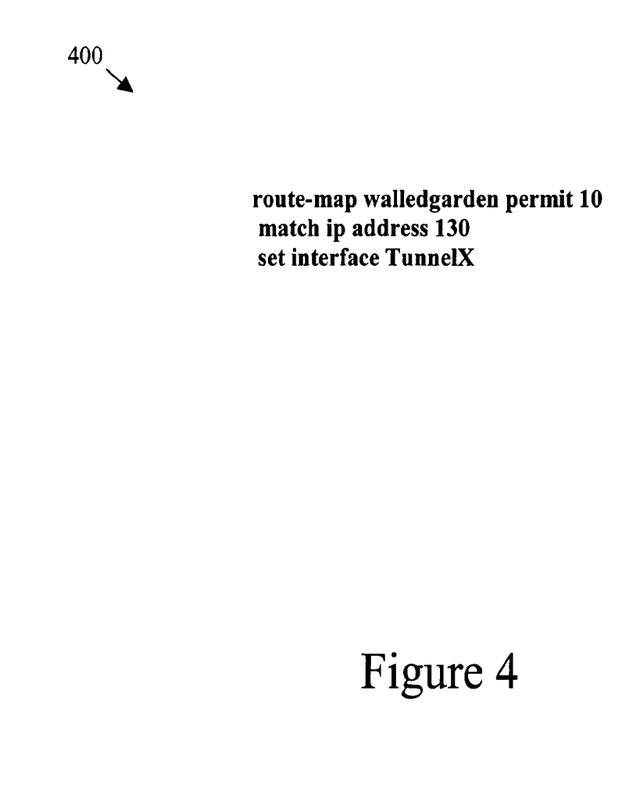
FIG. 4 shows exemplary route map directives to facilitate the steering of traffic through an interface tunnel.

FIG. 4 shows exemplary route map directives 400 to facilitate the steering of traffic through a tunnel interface. The exemplary route map directives 400 include a directive "match ip address 130" to perform Internet Protocol (IP) address matching for a particular access control list 130. The exemplary route map directives 400 also include a directive "set interface TunnelX" to set a particular interface tunnel X, where X represents a specific tunnel interface identifier. The exemplary route map directives 400 may reside and/or execute, for example, on a headend distribution switch 104.

Figure 5:
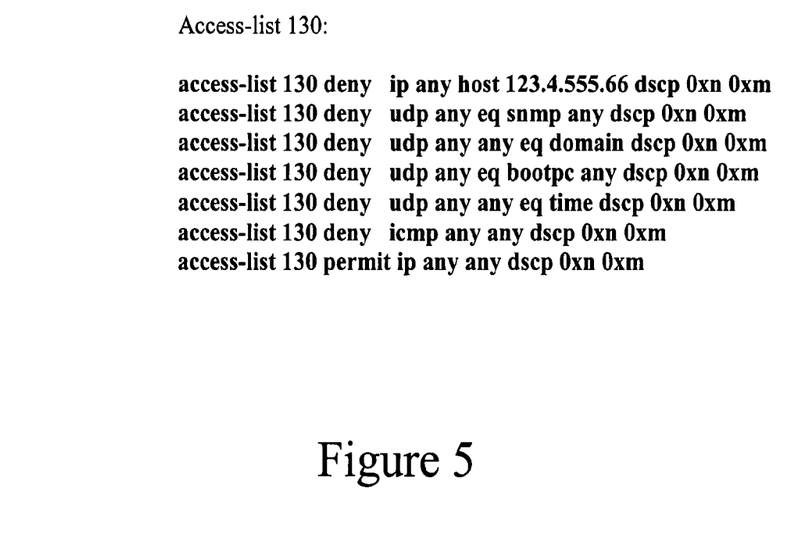
FIG. 5 shows an exemplary access control list.

FIG. 5 shows an exemplary Access Control List (ACL) 130 referred to by the route map directives 400 of FIG. 4. The Access Control List (ACL) 130 determines which traffic is sent to the tunnel X. In this regard, the exemplary Access Control List (ACL) 130 is configured to "permit" and "deny" certain types of incoming traffic with a "dscp" of "0xn 0xm" (here "dscp" refers to Differentiated Service Code Point (DSCP) which is a proprietary term used to refer to the re-written Type of Service (TOS) value). In particular, the Access Control List (130) is configured to permit all incoming traffic with a "dscp" of "0xn 0xm" and deny certain other types of traffic, including, for example, traffic destined to a particular self provisioning server, Simple Network Management Protocol (SNMP) traffic required for management purposes, Domain Name Server (DNS) traffic, Dynamic Host Configuration Protocol (DHCP) traffic, Time of Day (ToD) traffic required for cable modem boot-up, and Internet Control Message Protocol (ICMP) traffic required for management purposes. The exemplary Access Control List (ACL) 130 resides, for example, on a headend distribution switch 104.

Figure 6:
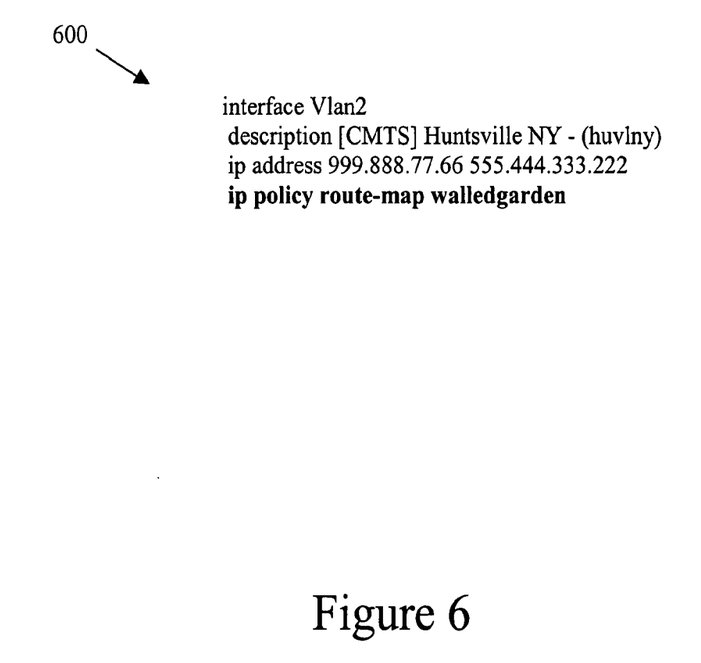
FIG. 6 shows exemplary directives to apply the exemplary route map directives of FIG. 4 to a virtual local area network.

FIG. 6 shows exemplary directives 600 to apply the route map directives 400 of FIG. 4 to a virtual local area network Vlan2. The exemplary directives 600 include a directive "ip policy route-map walled garden" to specify a policy that all incoming traffic is subject to the "walled garden" route-map as defined, for example, by the directives 400 of FIG. 4. The exemplary directives 600 may reside and/or execute, for example, on a headend distribution switch 104.

Figure 7:
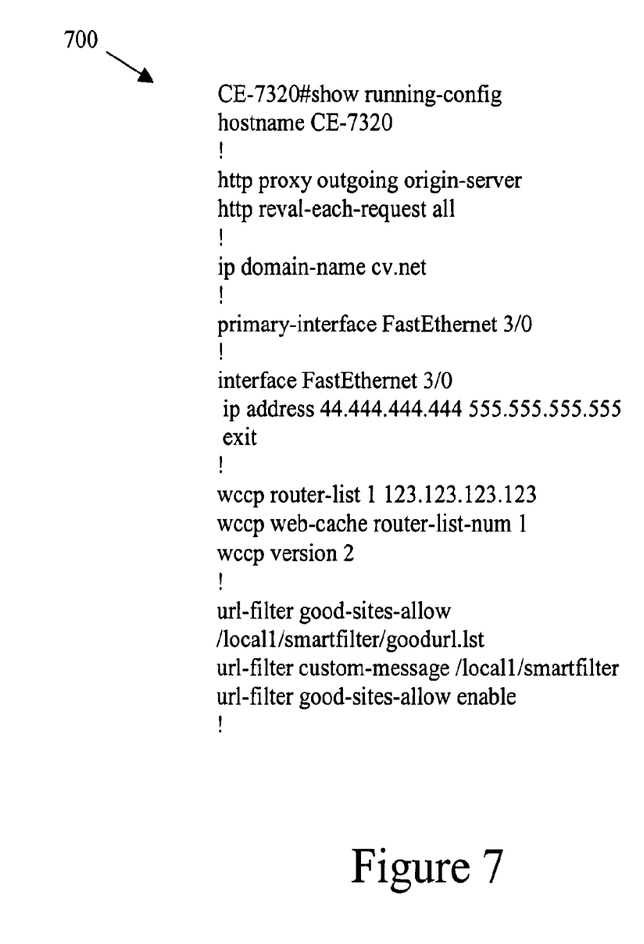
FIG. 7 shows exemplary directives to configure a cache server.

FIG. 7 shows exemplary directives 700 to configure the cache server 108. The exemplary directives 800 include directives "wccp router-list 1 123.123.123.123," "wccp web-cache router-list-num 1," and "wccp version 2" to specify a router at address 123.123.123.123 as an acceptable address for the purposes of establishing a Web Caching Communicating Protocol (WCCP) exchange. The exemplary directives 700 also include directives "url-filter good-sites-allow/local1/smart-fuler/goodurl.1st," "url-filter custom-message/local/smart-filter," and "url-filter good-sites-allow enable" to specify a file containing a list of allowed Web sites. The exemplary directives 700 may reside and/or execute, for example, on cache server 108.

Figure 8:
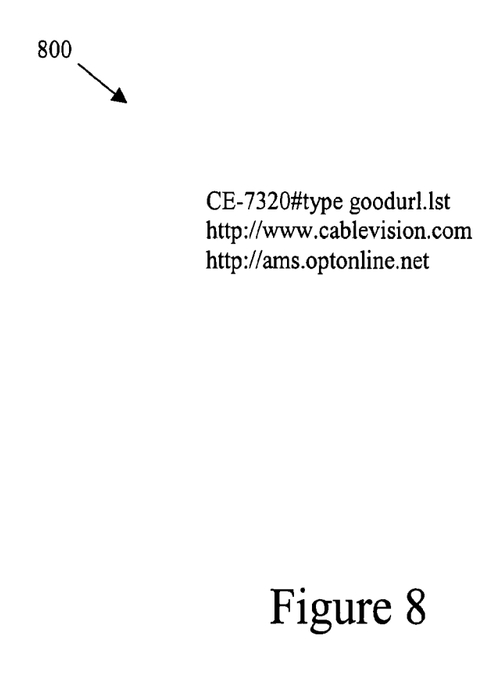
FIG. 8 shows exemplary contents of a file, which specify a list of exemplary Web sites that define a Walled Garden environment.

FIG. 8 shows exemplary contents 800 of the "goodurl.1st" file containing the list of allowed Web sites, as defined, for example, by the exemplary directives 700 of the FIG. 7. The exemplary contents 800 include two allowed Web sites: "http://www.cablevision.com" and "http://ams.optonline.net".

Figure 9:
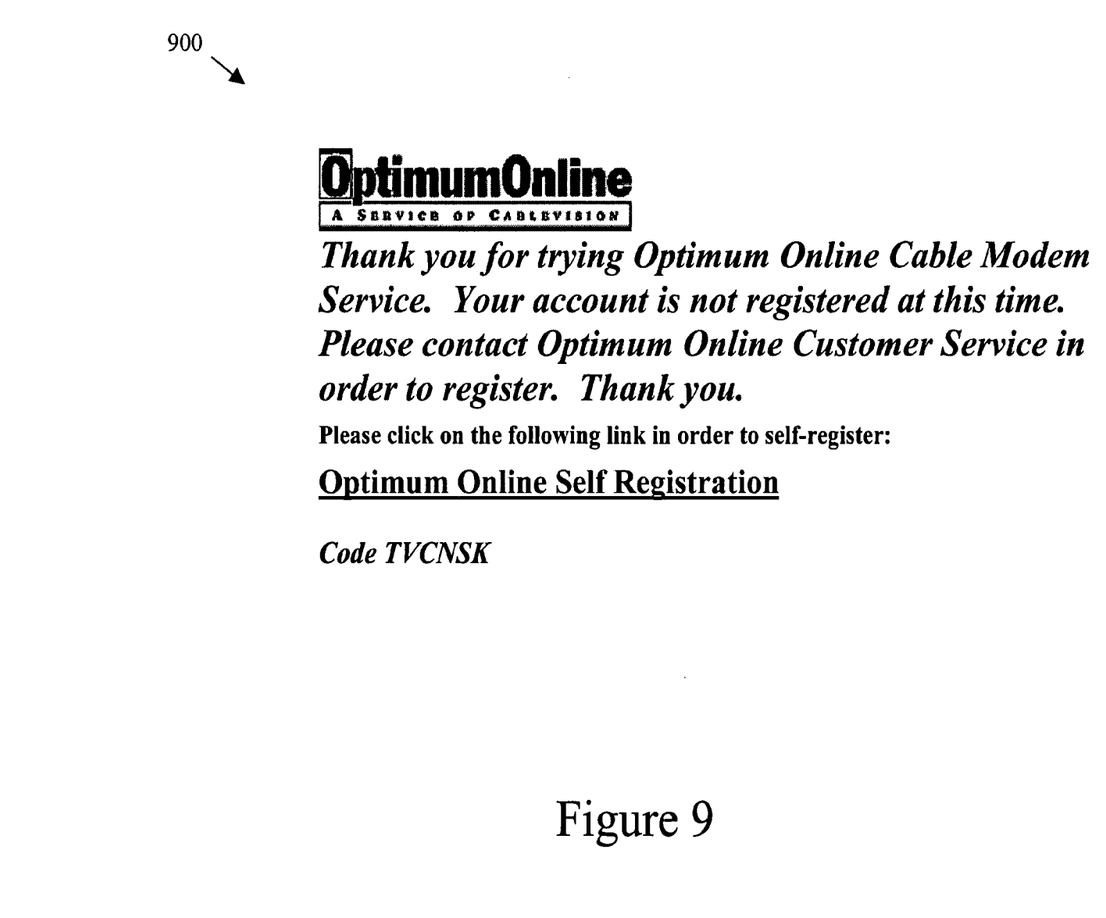
FIG. 9 shows an exemplary Web page display.

FIG. 9 shows an exemplary Web page display 900 that may be cached by the cache server 108. The exemplary Web page display 900 may include an indication of non-registration. The exemplary Web page display 900 may also include an HTML link to perform online self registration. The exemplary Web page display 900 may also include a code (e.g., "TVCNSK") for internal purposes. For example, the code may be supplied to a customer service representative so that the customer representative may identify the caller as a walled garden subscriber. The exemplary Web page 900 may be implemented, for example, by an internal Web page having an exemplary Uniform Resource Locator (URL) of /local1/smartfilter/block.html.

What is claimed is:

1. A method of redirecting network traffic at an intermediate network device from an uncontrolled network to a controlled network, the method comprising:

receiving, from a first network element, a plurality of Internet Protocol (IP) packets initially routed to the uncontrolled network;

rewriting IP packet header information of at least one of the plurality of IP packets based on a service class of the first network element, the service class of the first network element being maintained at the intermediate device, wherein rewriting the IP packet header information of the at least one IP packet includes rewriting a type of service field to include a service code indicating that the at least one IP packet cannot access the uncontrolled network, and based on the rewritten IP packet header information, redirecting the at least one IP packet to the controlled network.

2. The method of claim 1, further comprising rewriting a type of service field within the IP packet header information of the at least one IP packet.

3. The method of claim 1, wherein an address of the uncontrolled network is not modified in the IP packet header information of the at least one IP packet.

4. The method of claim 1, further comprising encapsulating with new header information the redirected IP packet having the rewritten IP packet header information.

5. The method of claim 1, further comprising rewriting IP packet header information of a second one of the plurality of IP packets based on a service class of a second network element, the service class of the second network element maintained at the intermediate device.

6. The method of claim 5, further comprising rewriting a type of service field of the IP packet header information of the second one of the IP packets.

7. The method of claim 1, further comprising determining a service class of the first network element based on parameters defining interactions between the first network element and other devices.

8. The method of claim 1, wherein the intermediate device is a cable modem termination system.

9. The method of claim 1, wherein the first network element is a cable modem.

10. A method of redirecting network traffic at an intermediate network device from an uncontrolled network to a controlled network, the method comprising:

receiving, from a first network element, a plurality of Internet Protocol (IP) packets initially routed to the uncontrolled network;

rewriting IP packet header information of a first one of the plurality of IP packets based on a service class of the first network element, the service class of the first network element being maintained at the intermediate device;

rewriting IP packet header information of a second one of the plurality of IP packets based on a service class of a second network element, the service class of the second network element maintained at the intermediate device;

rewriting a type of service field of the IP packet header information of the second one of the IP packets to include a service code indicating that the second one of the plurality of IP packets can access the controlled network; and based on the rewritten IP packet header information, redirecting the second one of the plurality of IP packet to the controlled network.

11. A method of redirecting network traffic at an intermediate network device, from an uncontrolled network to a controlled network, the method comprising:

receiving an Internet Protocol (IP) packet that designates the uncontrolled network as a destination address;

redirecting the IP packet to the controlled network based on a type of service field of IP packet header information of the IP packet;

comparing a service code stored in the type of service field to an access control list maintained at the intermediate device; and routing the IP packet through a tunnel interface.

12. The method of claim 11, wherein the access control list is configured to permit or deny network traffic according to a service level associated with the traffic.

13. The method of claim 11, wherein the access control list comprises differentiated service code point values.

14. The method of claim 11, wherein the IP packet is routed through the tunnel interface based on a route map directive.

15. The method of claim 11, wherein the intermediate device is a cable model termination system.

16. The method of claim 11, wherein the first network element is a cable modem.

17. A method of redirecting network traffic at an intermediate network device, from an uncontrolled network to a controlled network, the method comprising:

receiving an Internet Protocol (IP) packet that designates the uncontrolled network as a destination address;

redirecting the IP packet to the controlled network based on a type of service field of IP packet header information of the IP packet; and routing the IP packet through a tunnel interface based on a route map directive that causes redirection of the IP packet to the controlled network.

* * * * *